United States Patent
Leger et al.

(10) Patent No.: US 6,664,693 B2
(45) Date of Patent: Dec. 16, 2003

(54) FUEL CELL POWERED ELECTRICAL MOTOR

(75) Inventors: David Earl Leger, Chilliwack (CA); Shane Carver Black, Chilliwack (CA); Mark Chesley Mc Donald, Cultus Lake (CA)

(73) Assignee: Powerdisc Development Corporation Ltd., Chilliwack (CA)

( * ) Notice: Subject to any disclaimer, the term of this patent is extended or adjusted under 35 U.S.C. 154(b) by 99 days.

(21) Appl. No.: 10/021,749

(22) Filed: Dec. 10, 2001

(65) Prior Publication Data

US 2002/0074888 A1 Jun. 20, 2002

(30) Foreign Application Priority Data

Dec. 19, 2000 (CA) .............................................. 2329058

(51) Int. Cl.[7] .......................... H02K 3/00; H02K 31/00
(52) U.S. Cl. .......................... 310/180; 310/74; 310/178
(58) Field of Search .............................. 310/67 R, 68 R, 310/40 MM, 74, 254, 261, 178–180; 429/19–20, 30, 26, 69–72

(56) References Cited

U.S. PATENT DOCUMENTS

| | | | | |
|---|---|---|---|---|
| 4,650,727 A | * | 3/1987 | Vanderborgh et al. | 429/19 |
| 4,684,585 A | * | 8/1987 | Tamminen | 429/69 |
| 5,141,824 A | * | 8/1992 | Hirota | 429/23 |
| 5,248,566 A | * | 9/1993 | Kumar et al. | 429/19 |
| 5,409,784 A | * | 4/1995 | Bromberg et al. | 429/13 |
| 5,678,647 A | | 10/1997 | Wolfe et al. | |
| 5,923,106 A | | 7/1999 | Isaak et al. | |
| 6,005,322 A | | 12/1999 | Isaak et al. | |
| 6,106,963 A | * | 8/2000 | Nitta et al. | 429/19 |
| 6,321,145 B1 | | 11/2001 | Rajashekara | |

* cited by examiner

*Primary Examiner*—Tran Nguyen
(74) *Attorney, Agent, or Firm*—Brian Lee

(57) ABSTRACT

The fuel cell powered electrical motor comprises an electrical motor and a plurality of fuel cell stacks. The electrical motor includes a shaft assembly, a stator encircling the shaft assembly, a rotor encircling the stator, a flywheel located perpendicularly to the shaft assembly, at a top part of the latter, and a base plate located perpendicularly to the shaft assembly, at a low part of the latter. Base plate is designed to allow a fuel from an outside source to enter and exit the several fuel cell stacks and is also adapted for the passage of electrical power output from the fuel cell stacks to an external controller and from the latter to the stator and rotor.

5 Claims, 3 Drawing Sheets

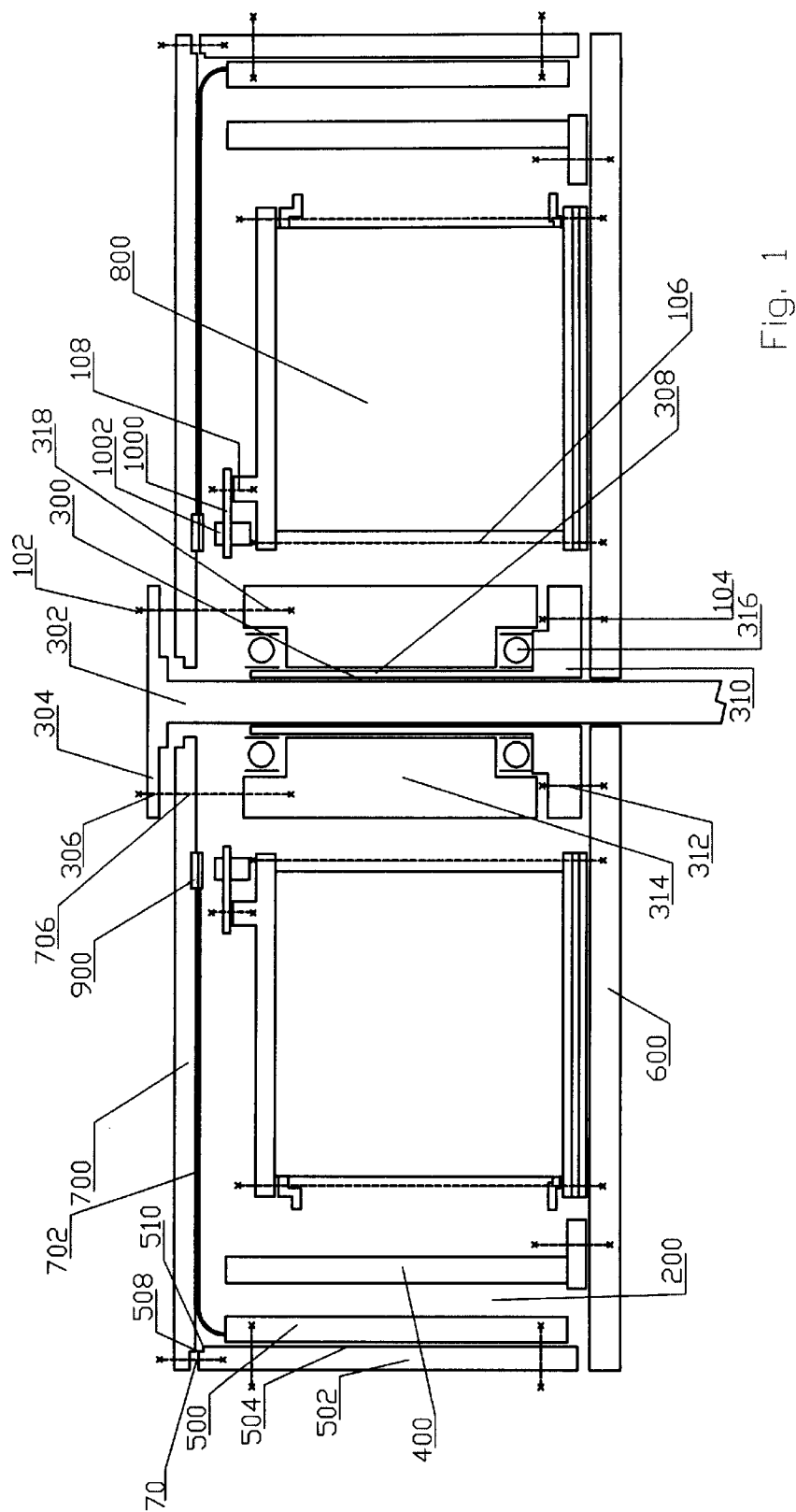

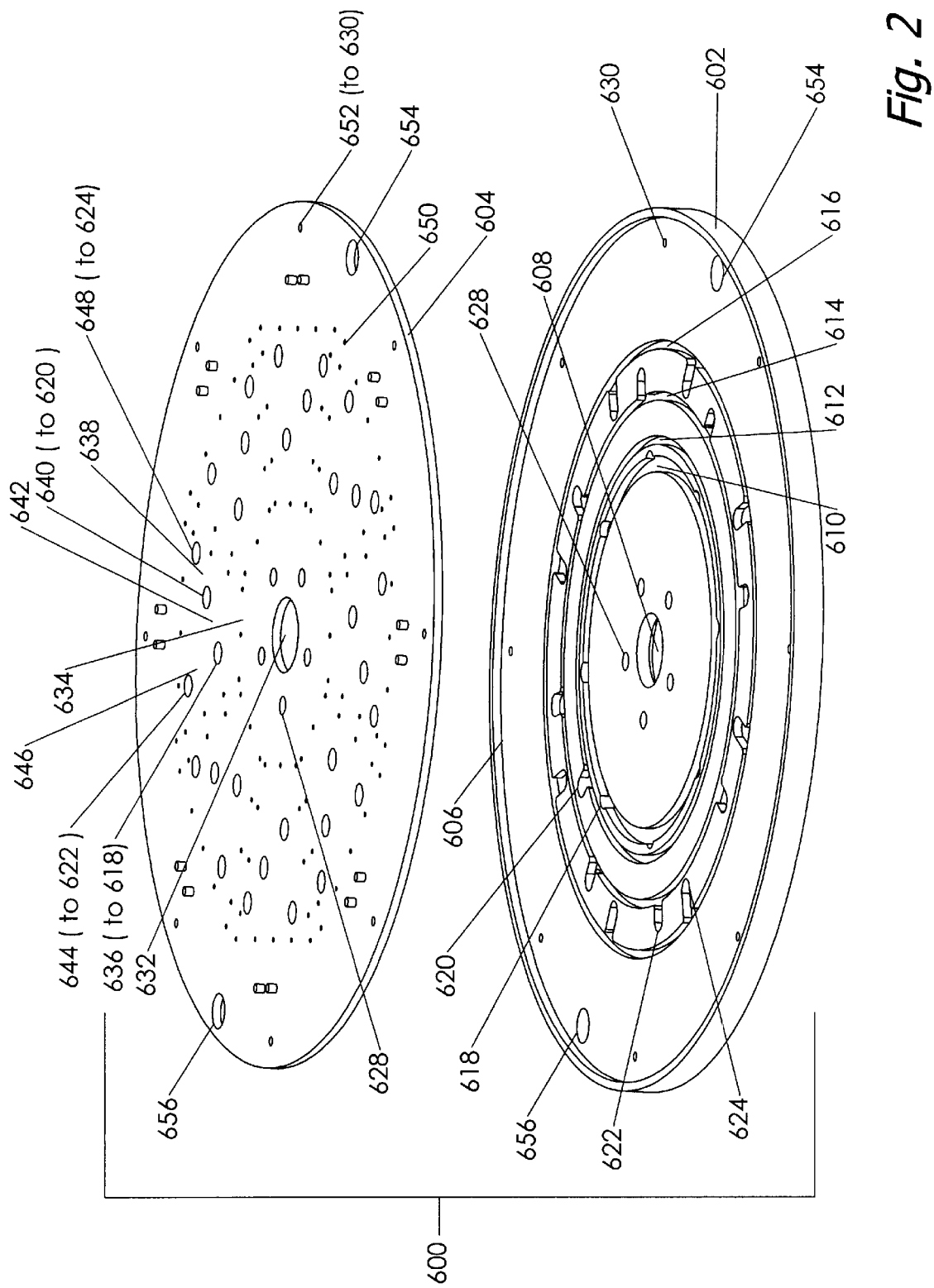

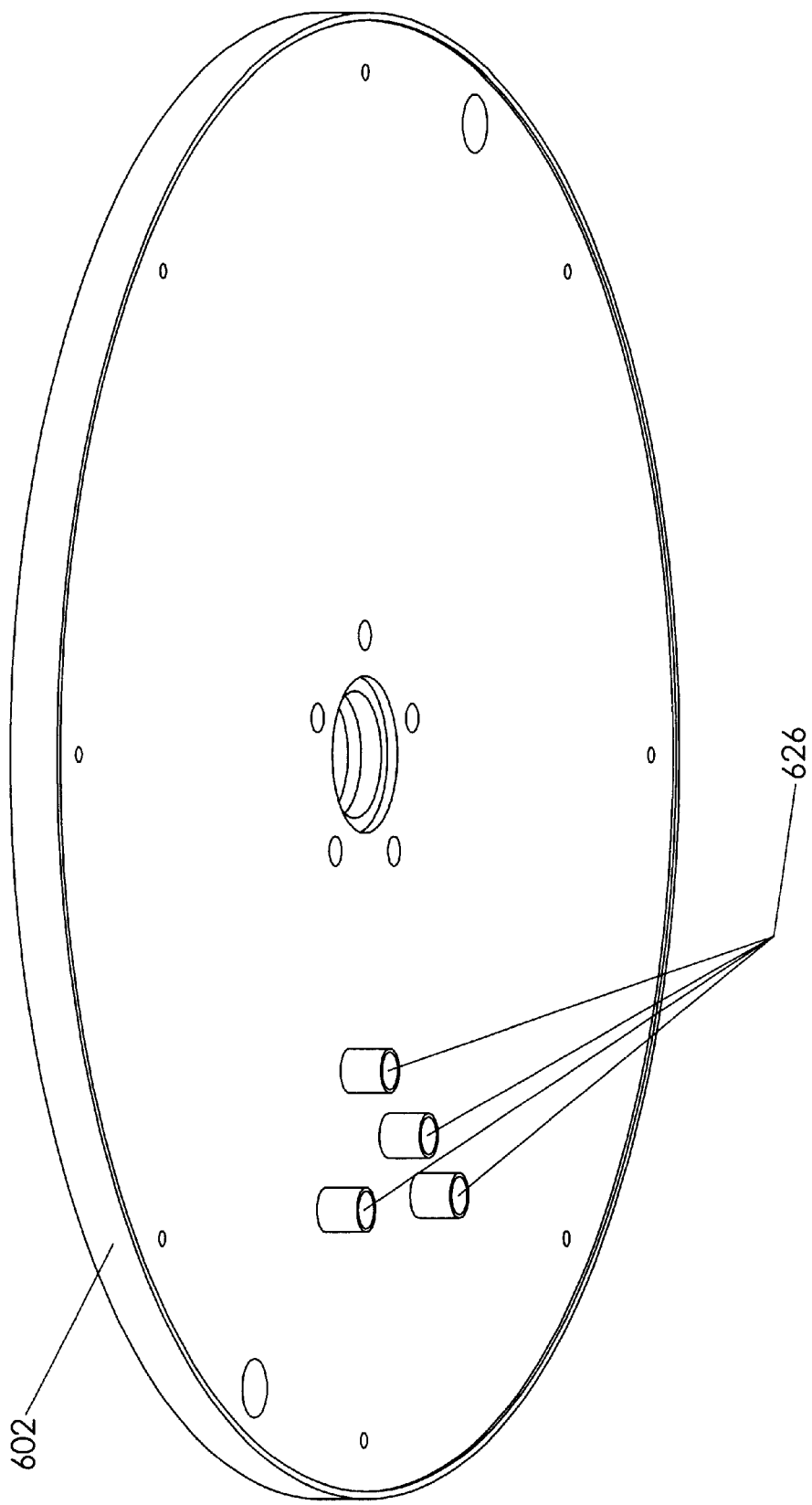

FUEL CELL POWERED ELECTRICAL MOTOR

BACKGROUND OF THE INVENTION

1. Field of the Invention

This invention relates in general to fuel cells and electrical motors and, more particularly, to a fuel cell powered electrical motor.

2. Description of the Related Prior Art

The use of fuel cells to actuate electrical motors depends upon several factors. Among them efficiency and compactness are essential.

Attempts have been made in the past to introduce a better fuel cell powered electrical motor. Thus, U.S. Pat. No. 5,678,647 dated Oct. 21, 1997 and granted to Wolfe et al. for a "Fuel Cell Powered Propulsion System" describes a system for powering a vehicle. This system comprises an electrical motor for powering a vehicle, a fuel cell stack for providing fuel cell power and a turbine-generator unit. The latter includes a generator for supplying power output and a turbine for driving the generator. This system is believed to have an important disadvantage that resides in its lack of compactness, the components of the system being connected functionally, rather than structurally. U.S. Pat. No. 5,923,106, dated Jul. 13, 1999 and granted to Isaak et al. for an "Integrated Fuel Cell Electrical Motor with Static Fuel Cell and Rotating Magnets" describes a fuel cell with an electrical output integrated within a cylindrical form monopole electric motor. A rotor and a shaft are supported by a bearing attached to the top of the main body of the electrical motor, by another bearing attached to the cover of the body and by a third bearing attached to the bottom of the body. This motor has an important shortcoming. Structurally, the motor is not well engineered, since an accurate coaxiality of the three bearings mounted separately in three different components cannot be easily obtained. U.S. Pat. No. 6,005,322 dated Dec. 21, 1999 and granted to Isaak et al. for an "Integrated Fuel Cell Electric Motor" relates to a motor similar to that described in the above United States Patent, wherein the cell is rotating.

Besides the shortcoming of above United States Patent, the use of a rotating cell increases the mass to be balanced. Thus, it is more difficult to obtain and, especially, to maintain. the balancing of the rotating part of the system.

SUMMARY OF THE INVENTION

There is accordingly a need for a fuel cell powered electrical motor which is well engineered, so that the components are easy to manufacture and reliable in operation. It is further desirable to have a compact, versatile and efficient fuel cell powered electrical motor.

Broadly described, the present invention is directed to a fuel cell powered electrical motor which comprises an electrical motor including shaft means, stator means encircling the shaft means and rotor means encircling the stator means. Furthermore, the electrical motor incorporates a base plate means, located perpendicularly to the shaft means at a low part of the latter, and a flywheel means located perpendicularly to the shaft means at a top part of the latter. Fuel cell stack means are circularly disposed on the base plate means between the shaft and stator means, concentrically with both. The shaft means basically revolves together with the flywheel and rotor means with respect to the base plate means, while the fuel cell stack and stator means are attached to the base plate means.

In one aspect of this invention, the fuel cell powered motor includes a commutator located under and attached to the flywheel means. The commutator is electrically connected to the fuel cell stack and rotor means.

In another aspect of this invention, the fuel cell powered motor includes an annular brush disk attached to a top of the fuel cell stack means. The annular brush disk is provided at its upper surface with a plurality of brushes. The latter are adapted to be connected to an outside source of electrical power.

In yet another aspect of this invention, the shaft assembly comprises: a main shaft having an upper flange provided with several apertures, equally spaced and circularly disposed; a flanged sleeve having a low flange provided with several openings, equally spaced and circularly disposed; and a bearing housing internally provided at both ends with a bearing. The bearing housing is mounted on the flanged sleeve. The upper flange is attached to the flywheel means and the bearing housing. The lower flange is attached to the flanged sleeve.

In a further aspect of this invention, the base plate means incorporates a manifold and a sealing plate. The latter is disposed on top of the manifold plate. The manifold plate has a circular recess wherein the sealing plate is lodged. The circular recess is provided at its center with a shaft hole for a main shaft of the shaft assembly. Concentrical channel means is located coaxially with the shaft hole, while notch means extends radially from each of the concentrical channel means. Several downwardly extending apertures start from each of the concentric channel means and communicate with the exterior. Several manifold plate openings are located proximate to a periphery of the circular recess. The sealing plate is provided at its center with a passage hole, while four-hole row means are concentrically disposed around the passage hole. Each hole row means has a series of notch hole means, which correspond, with the notch means in the manifold plate. Both manifold and sealing plates are provided with a pair of coinciding slots: a first slot adapted for an electrical power output from the fuel cell stack means to an external controller and a second slot adapted for an electrical power input from the external controller to the stator and rotor means.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming part hereof, wherein like reference numerals refer to like parts throughout the several views in which:

FIG. 1 diagrammatically illustrates the fuel cell powered electrical motor;

FIG. 2 is an isometric exploded view of the base plate; and

FIG. 3 is an isometric view, from the bottom, of the manifold plate.

DESCRIPTION OF THE PREFERRED EMBODIMENT

Referring now to FIG. 1, a fuel cell powered electrical motor 100, comprising an electrical motor 200, having a shaft assembly 300, a stator 400 encircling the latter and a rotor 500 encircling stator 400. Furthermore, fuel cell powered electrical motor 100 comprises a base plate 600, located perpendicularly to shaft assembly 300, at a low part of the latter, while a flywheel 700 is also located perpendicularly to shaft assembly 300, but at a top part of the latter.

A plurality of fuel cells stacks 800 is circularly disposed on base plate 600 between shaft assembly 300 and stator 400, concentrically with the former and latter. Preferably, each fuel cell stack 800 has a form of a trapezoidal prism.

Referring now in detail (see FIG. 1), shaft assembly 300 incorporates a main shaft 302 having an upper flange 304 provided with several apertures 306, equally spaced and circularly disposed. Furthermore, shaft assembly 300 comprises a flanged sleeve 308 provided with a lower flange 310 having several openings 312, equally spaced and circularly disposed. A bearing housing 314, internally provided at both ends with a bearing 316, is mounted on flanged sleeve 308.

Threaded holes 318 are disposed in an upper side 320 of bearing housing 314 to coincide with apertures 306 in upper flange 308.

Stator 400, essentially of conventional type, incorporates a plurality of windings (not shown).

Rotor 500, also of essentially conventional type, incorporates a cylindrical part 502 having an interior surface 504, to which a plurality of electromagnetic units 506 is attached. An upper side 508 of cylindrical part 502 is provided with a circular notch 510, inwardly opened, for lodging flywheel 700.

Base plate 600 (see FIGS. 2 and 3) includes a manifold plate 602, on top of which a sealing plate 604 is disposed. Manifold plate 602 has, in the present embodiment, a disk shape with an upper face 604. In the latter, a circular recess 606 is provided. Manifold plate 602 and circular recess 606 are coaxial. A shaft hole 608 is located, centrally, in circular recess 606. Around shaft hole 608, four concentric channels are disposed: a first channel concentric with shaft hole 608 encircles the latter; a second channel 612 encircles first channel 610; a third channel 614 encircles second channel 612; and, finally, a fourth channel 616 encircles third channel 614.

Several first notches 618 extend radially from first channel 610. Several second notches 620 extend radially from second channel 612. Several third notches 622 extend radially from third channel 614. Several fourth notches 624 extend radially from fourth channel 616. Several downwardly extending apertures 626, starting from each of the four concentrically channels 610 through 616, communicate with the exterior.

There are several attaching openings 628 concentrically disposed with shaft hole 608, between the latter and first channel 610. Attaching openings 628 axially coincide with openings 312 provided in lower flange 310 of flanged sleeve 308. Proximate to the periphery of circular recess 606, several manifold plate openings 630 are located.

Sealing plate 604 has a disk form with a surface commensurate with circular recess 606 of manifold plate 602, so that the former can be lodged in the latter. In the center of the sealing plate 604 a passage hole 632 is located. There are four hole rows concentrically with passage hole 632: first hole row 634 containing a series of first notch holes 636 coinciding with first notches 618; second hole row 638 containing a series of second notch holes 640 coinciding with second notches 620; third hole row 642 containing a series of third notch holes 644 coinciding with third notches 622; and finally a fourth hole row 646 containing a series of third notch holes 648 coinciding with fourth notches 624. Manifold plate 602 and sealing plate 604 are both provided with two coinciding slots: a first slot 647 for electrical power output from fuel cell stacks 800 to an external controller (not shown) and a second slot 647' for electrical power input from the external controller to stator 400 and rotor 500. In both first and second slots 647 and 647' sockets of conventional type (not shown) are mounted.

A plurality of threaded mounting holes 650, provided in sealing plate 604, are used for attaching fuel cell stacks 800 and stator 400. Several holes 652 coinciding with manifold plate opening 630 are located proximate to the periphery of sealing plate 604 and are used for securing sealing plate 604 to manifold plate 602, by using conventional means. Base plate 600 allows a fuel from an outside source to enter and exit several fuel cell stacks 800 by passing throughout the following: downwardly extending apertures 626, four concentric channels 610 to 616, first to fourth notches 618 to 624 and, finally, first to fourth notch holes 636, 640, 644 and 648 respectively.

Flywheel 700 has a lower surface 702 provided with a recess 704, the latter being coaxial and merging with upper flange 304 of main shaft 302. Consequently, upper flange 304 is lodged in recess 704. Flywheel 700 is provided, as well, with circular slots 706 corresponding to apertures 306 of upper flange 304 and threaded holes 318 of bearing housing 314.

A commutator 900 is disposed under and attached to flywheel 700. Commutator 900 is electrically connected to electromagnetic units 506 of rotor 500 and to the plurality of fuel cell stacks 800.

An annular brush disk 1000 is attached to the top of the fuel cell stacks 800 and is provided on its upper surface with a plurality of brushes 1002, equally spaced and circumferentially disposed. Brushes 1002 are electrically connected to an outside electrical power source (not shown).

First fasteners 102 are used to attach flywheel 700 and upper flange 304 to bearing housing 314.

Second fasteners 104 are used to attach flanged sleeve 308 to base plate 600.

Third fasteners 106 are used to attach fuel cell stacks 800 to base plate 600.

Fourth fasteners 108 are used to attach annular brush disk 1000 to fuel cell stack 800.

Fuel cell powered electrical motor 100 operates as follows:

As in conventional fuel cell stacks, appropriate fuel is supplied. Base plate 600 allows the passage and distributing of gases to fuel cell stacks 800. Furthermore, base plate 600 is used for connection of output of electrical power produced by fuel cell stacks 800 to an external controller and input of electrical power received from the external controller.

As required, a detailed embodiment of the present invention is disclosed herein; however, it is to be understood that the disclosed embodiment is merely exemplary of the invention, which may be embodied in various forms. Therefore, specific structural and functional details disclosed herein are not to be interpreted as limiting, but merely as a basis for the claims and as representative basis for teaching one skilled in the art to variously employ the present invention in virtually any appropriately detailed structure. It should be noted that the use of terms such as top, bottom, front, back, etc., is for the purpose of providing relative reference only, and not intended to suggest any limitations on how the fuel cell basic unit 100 may be positioned or mounted as an entity or in an assembly.

The embodiments of the invention in which an exclusive property or privilege is claimed are defined as follows:

1. Fuel cell powered electrical motor comprising, an electrical motor including
- shaft means;
- stator means encircling said shaft means;
- rotor means encircling said stator means;
- a base plate means located perpendicularly to said shaft means, at a low part of said shaft means;
- said fuel cell powered electrical motor further comprising a flywheel means and fuel cell stack means, wherein said flywheel means located perpendicularly to said shaft means, at a top part of said shaft means; and
- said fuel cell stack means circularly disposed on said base plate means, and concentrically located between said shaft means and said stator means said shaft means revolving together with said flywheel and rotor means, while said fuel cell stack and stator means are attached to said base plate means.

2. Fuel cell powered electrical motor, as defined in claim 1, further comprising a commutator disposed under and attached to said flywheel means, said commutator being electrically connected to said rotor means and to said fuel cell stack means.

3. Fuel cell powered electrical motor, as defined in claim 1 or 2, further comprising an annular brush disk attached to a top of said fuel cell stack means and provided on an upper surface of said brush disk a plurality of brushes, equally spaced and circumferentially disposed, said brushes being connected to an outside electrical power source.

4. Fuel cell powered electrical motor, as defined in claim 1 wherein said shaft means incorporates
- a main shaft having an upper flange, provided with several apertures equally spaced and circularly disposed;
- a flanged sleeve having a lower flange provided with several openings equally spaced and circularly disposed; and
- a bearing housing, internally provided at both ends with a bearing, is mounted on said flanged sleeve;
- said upper flange being attached to said flywheel means and said bearing housing, while said lower flange is attached to said base plate means.

5. Fuel cell powered electrical motor, as defined in claim 1, wherein said base plate means incorporates
- a manifold plate; and
- a sealing plate disposed on top of said manifold plate;
- said manifold plate having a circular recess wherein said sealing plate is lodged, said circular recess being provided at a center thereof with a shaft hole for a main shaft of said shaft assembly, concentrical channel means being located coaxially with said shaft hole, while notch means extends radially from each of said concentrical channel means, several downwardly extending apertures starting from each of said concentrical channel means communicating with the exterior, several manifold plate openings being located proximate to a periphery of said circular recess;
- said sealing plate being provided at a center thereof with a passage hole, while four hole row means are concentrically disposed around said passage hole, each hole row means having a series of notch hole means which coincides with corresponding notch means in said manifold plate; both manifold and sealing plates being provided with a pair of coinciding slots: a first slot is for an electrical power output from said fuel cell stack means to an external controller and a second slot is for an electrical power input from said external controller to said stator and rotor means.

* * * * *